United States Patent
Yee et al.

[11] Patent Number: 6,038,150
[45] Date of Patent: Mar. 14, 2000

[54] TRANSISTORIZED RECTIFIER FOR A MULTIPLE OUTPUT CONVERTER

[76] Inventors: Hsian-Pei Yee, 7338 23rd. Ave., NE., Seattle, Wash. 98115; Satoru Sawahata, 10-14 Hon-Cho, Hanno Saitama 357-0032; Masaru Wakatabe, 195-12, Kasanui, Hanno, Saitama 357-0045, both of Japan

[21] Appl. No.: 09/039,018

[22] Filed: Mar. 13, 1998

Related U.S. Application Data

[60] Provisional application No. 60/053,487, Jul. 23, 1997.

[51] Int. Cl.[7] .................................................. H02M 7/217
[52] U.S. Cl. ............................................. 363/89; 363/127
[58] Field of Search ....................................... 363/89, 127

[56] References Cited

U.S. PATENT DOCUMENTS

| | | | |
|---|---|---|---|
| 3,582,758 | 6/1971 | Gunn | 363/127 |
| 4,870,555 | 9/1989 | White | 363/127 |
| 4,922,404 | 5/1990 | Ludwig et al. | 363/89 |
| 5,144,547 | 9/1992 | Masamoto | 363/127 |
| 5,528,480 | 6/1996 | Kikinis et al. | 363/89 |
| 5,734,563 | 3/1998 | Shinada | 363/127 |
| 5,742,491 | 4/1998 | Bowman et al. | 363/89 |
| 5,774,350 | 6/1998 | Notaro et al. | 363/89 |

*Primary Examiner*—Jeffrey Sterrett
*Attorney, Agent, or Firm*—Claude A.S. Hamrick; Emil Chang; Oppenheimer Wolff & Donnelly LLP

[57] ABSTRACT

A secondary subcircuit of a converter circuit is disclosed where a method and circuit for operating a transistor to prevent reverse conduction of the current in the secondary subcircuit is disclosed. The diode in the secondary subcircuits of the prior art is replaced by a transistor and the circuitry for controlling the transistor is made part of the control circuit (ASIC). The secondary converter subcircuit includes a secondary coil for generating a voltage that passes through a first transistor M1, a capacitor, and a second transistor M2, where the output terminal of the subcircuit is across said capacitor. A presently preferred embodiment of a control circuit detects the voltage level at a sync node and the output voltage level at the output terminal and controls transistors M1 and M2 accordingly in generating the desired voltage level at the output terminal.

34 Claims, 7 Drawing Sheets

TRANSISTORIZED RECTIFIER FOR A MULTIPLE OUTPUT CONVERTER

PRIORITY CLAIM

This application claims priority to a provisional application entitled "Diode-less Multiple Output Flyback Converters" filed on Jul. 23, 1997, having an application Ser. No. 60/053,487.

BACKGROUND OF THE INVENTION

1. Field of the Invention

The present invention generally relates to power converters, and, more particularly, to multiple output converters.

2. Description of the Prior Art

Multiple output converters have become increasingly popular as the demand increases for multiple voltage levels within modern electronics. Traditionally, the primary output of a converter is regulated via an error voltage signal fed back to the primary pulse-width modulation (PWM) control circuit, and the secondary outputs are regulated either by linear regulators or magnetic amplifiers.

Figure 1:
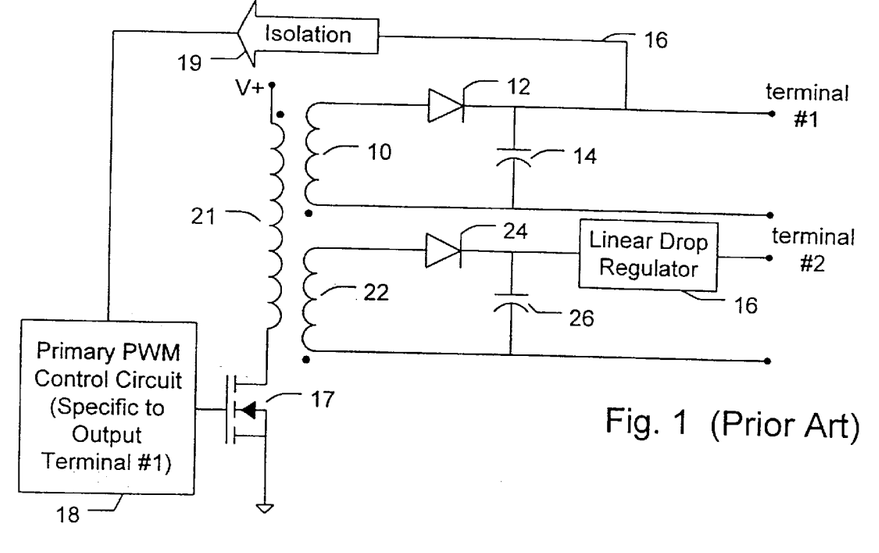
FIG. 1 illustrates a prior art flyback converter having a primary subcircuit and a secondary subcircuit where the secondary subcircuit uses a linear drop regulator to regulate the voltage level generated at output terminal #2.

The use of a linear regulator in a converter circuit is illustrated in FIG. 1. The primary output subcircuit for generating power at output terminal #1 includes a secondary coil 10 that is responsive to a primary coil 21 for generating a voltage/current that passes through a diode 12 and a capacitor 14. A feedback line 16 from output terminal #1 is connected to the primary PWM control circuit 18 through an isolation unit 19. The primary PWM control circuit 18 detects the level of the feedback signal and correspondingly adjusts the fluctuation of the voltage to the control gate of the transistor 17 where the transistor is turned on and off, thereby adjusting the fluctuation of the current going through the primary coil 21. The fluctuation of the current going through the coil 21 causes the primary coil 21 to generate a magnetic field having an intensity that corresponds to the frequency of the current fluctuation. The magnetic field in turn affects the secondary coil 10 and causes the secondary coil 10 to generate a voltage/current at output terminal #1 of the primary output subcircuit (via the diode).

The secondary subcircuit for generating a voltage/current at output terminal #2 comprises a secondary coil 22 responding to the primary coil in generating a voltage/current that passes through a diode 24 and a capacitor 26 where the output at output terminal #2 is regulated by a linear drop regulator 16. While the use of linear regulators are fairly simple, their use is limited to low current outputs because of the relatively low efficiency of the linear regulators. Note that there can be more than one secondary subcircuits for generating different voltages.

Figure 2:
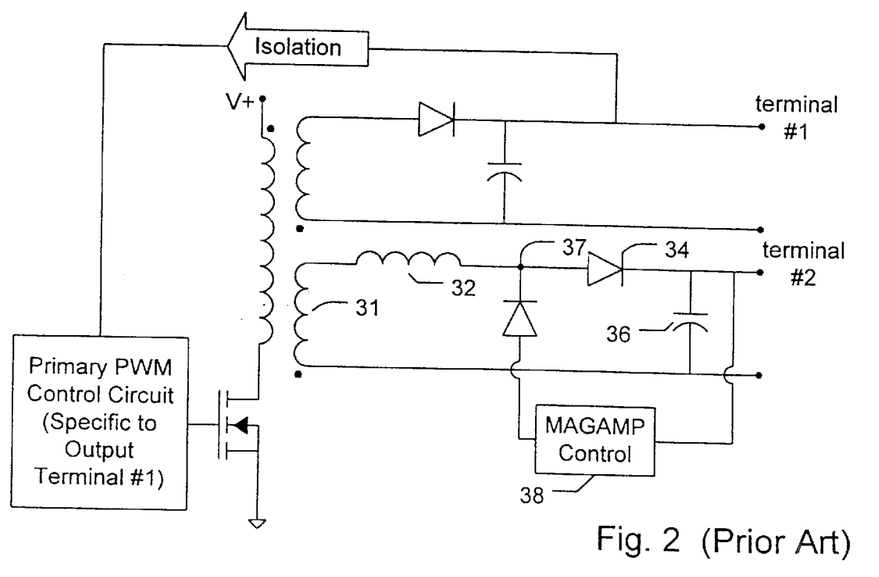
FIG. 2 illustrates a prior art flyback converter having a primary subcircuit and a secondary subcircuit where the secondary subcircuit uses a magamp and magamp control circuit to regulate the voltage level generated at output terminal #2.

For magnetic amplifiers (magamp), referring to FIG. 2, while the primary output subcircuit can be the same, the secondary subcircuit 30 generally comprises a secondary coil 31 for generating a voltage/current that passes through a magamp 32, a diode 34, and a capacitor 36. A magamp control circuit 38 senses the voltage level at output terminal #2 and generates a control signal to node 37 to cause the subcircuit to produce the overall and desired output. While this type of circuit is suitable for high current outputs, it is difficult to control the output when the load current is low. Also, it is a relatively complex circuit when compared to a semiconductor switch.

Figure 3:
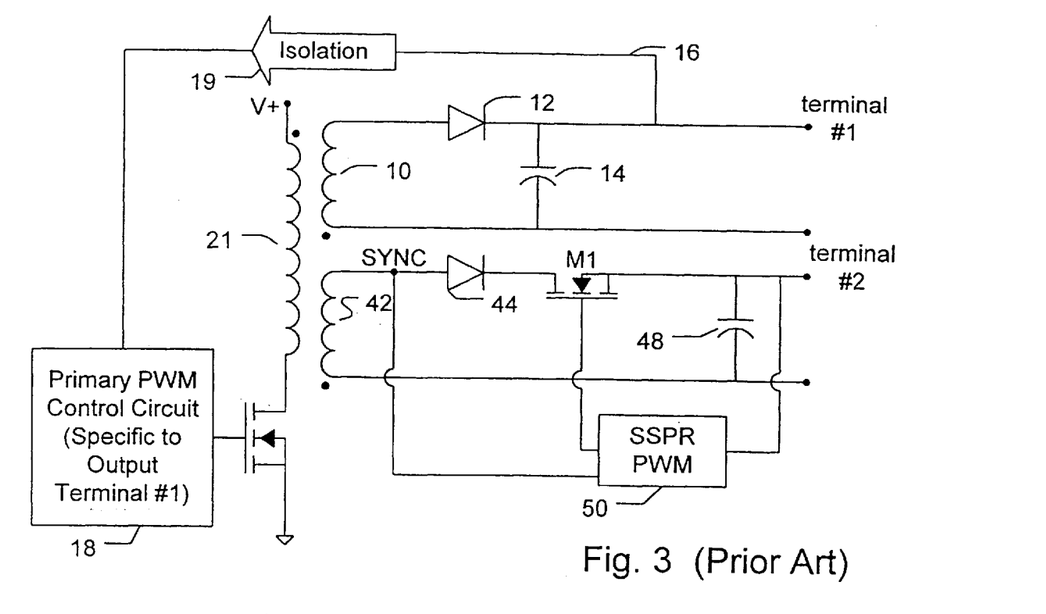
FIG. 3 illustrates a prior art flyback converter having a primary subcircuit and a secondary subcircuit where the secondary subcircuit uses a transistor controlled by a secondary side post regulator in regulating the voltage level generated at output terminal #2.

Recently, a third option has become available with the introduction of secondary side post regulator (SSPR) control circuits, which can be in the form of application-specific integrated circuits (ASICs). Referring to FIG. 3, a secondary converter subcircuit comprises a secondary coil 42 for generating a voltage/current that passes through a diode 44, transistor M1, and a capacitor 48. A SSPR ASIC 50, sensing the voltage/current levels between two points (output terminal #2 and the sync node), generates a control signal to the gate terminal of a transistor M1 to control the voltage level generated at output terminal #2. The SSPR circuit has a simpler design than that of the magamp and provides better efficiency than that of a linear regulator. The use of SSPR PWM ASIC can significantly improve converter efficiency and simplify the converter design process. On the other hand, a converter using a SSPR/MOSFET combination is no more efficient than a converter using a magamp. In fact, it can be argued that a magamp is a more efficient switch than a SSPR/MOSFET switch.

However, all three types of circuits utilize a diode for the secondary subcircuits on the secondary side, which reduces converter efficiency—particularly for low voltage and high current output applications. These conventional flyback converters require a diode in the subcircuits as shown in FIGS. 1–3 to prevent the capacitor from discharging when the primary switch is turned on. By using a diode in the circuit path, it results in a voltage drop of approximately 0.6 volt.

It would be desirable to have a converter circuit that does not utilize a component such as a diode so that there is not a voltage drop in the converter circuit.

SUMMARY OF THE INVENTION

Therefore, it is an object of the present invention to provide a converter subcircuit that does not require a diode.

It is another object of the present invention to provide a diodeless converter subcircuit using a transistor to prevent reverse conduction while providing forward conduction.

It is another object of the present invention to provide a diodeless converter using a transistor where the body diode of the transistor is used to detect the presence of any current flowing through the transistor.

Briefly, a presently preferred embodiment of the present invention uses and operates a transistor to prevent reverse conduction of the current in the secondary subcircuit of a converter circuit. The diode in the secondary subcircuits of the prior art is replaced by a transistor and the circuitry for controlling the transistor is made part of the control circuit (ASIC). The secondary subcircuit includes a secondary coil 60 for generating a voltage that passes through a first transistor M1, a capacitor 62, and a second transistor M2, where the output of the secondary subcircuit is generated at output terminal #2. A presently preferred embodiment of a control circuit 64 detects the subcircuit output level at the sync node and at output terminal #2 and controls transistors M1 and M2 accordingly in generating the desired output at output terminal #2.

An advantage of the present invention is that it provides a converter subcircuit that does not require a diode.

Another advantage of the present invention is that it provides a diodeless converter subcircuit using a transistor to prevent reverse conduction.

Yet another advantage of the present invention is that it provides a diodeless converter using a transistor where the body diode of the transistor is used to detect the presence of any current flowing through the transistor.

These and other features and advantages of the present invention will become well understood upon examining the figures and reading the following detailed description of the invention.

DETAILED DESCRIPTION OF THE PREFERRED EMBODIMENTS

Figure 4:
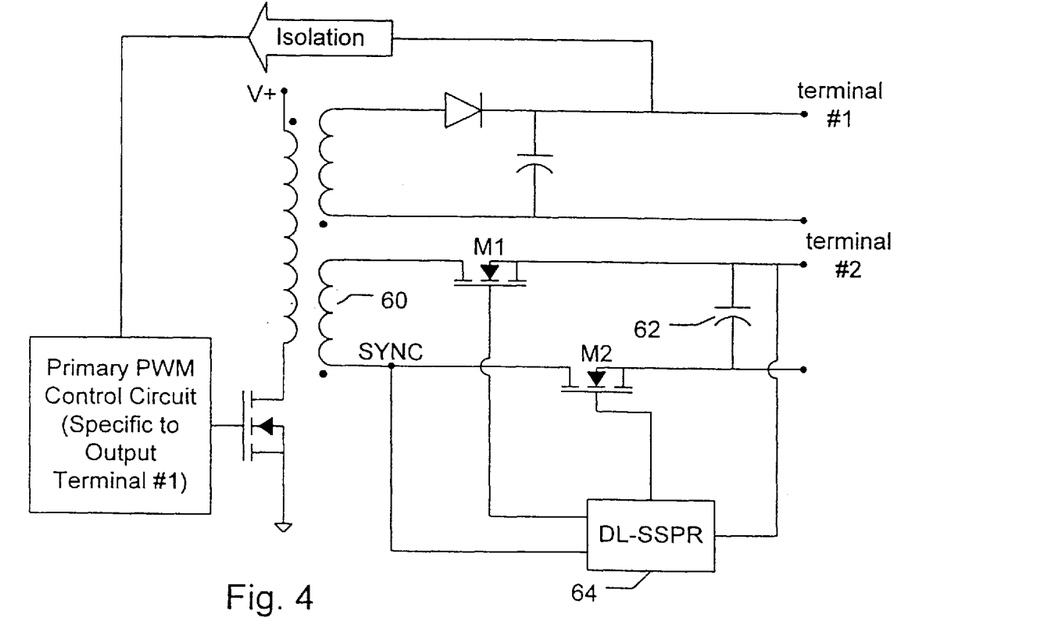
FIG. 4 illustrates a converter circuit having a primary subcircuit and a secondary subcircuit where the secondary subcircuit uses a transistor controlled by a diode-less secondary side post regulator in regulating the voltage level generated at output terminal #2.

A presently preferred embodiment of the present invention provides a novel circuit for diode-less secondary side post regulation (DL-SSPR). Referring to FIG. 4, generally speaking, while the primary subcircuit for generating the primary output can be the same, the diode in the secondary subcircuits of the prior art is replaced by a MOSFET and the circuitry for controlling the MOSFET is made part of the control circuit (ASIC). At the same time, secondary side post regulation is maintained through the use of anther MOSFET. The secondary subcircuit includes a secondary coil 60 for generating a current/voltage that passes through a first transistor M1, a capacitor 62, and a second transistor M2, where the output of the secondary subcircuit is generated at output terminal #2. A presently preferred embodiment of a control circuit 64 detects the subcircuit output level at the sync node and at output terminal #2 and controls transistors M1 and M2 accordingly in generating the desired output at output terminal #2.

Figures 5A, 5B:
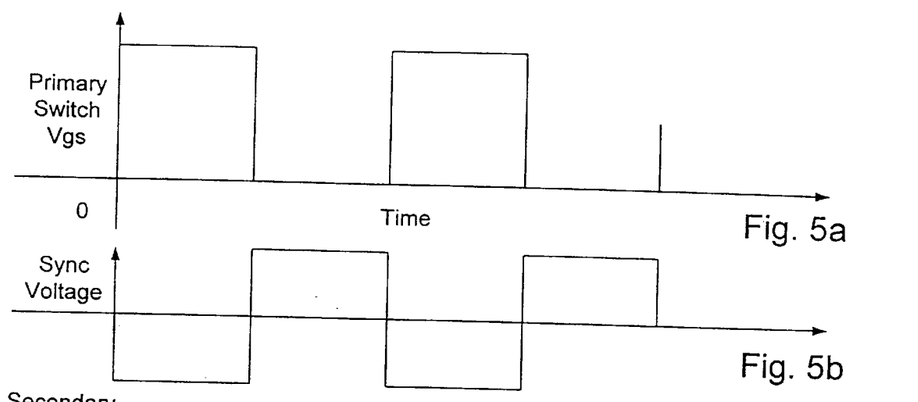
FIGS. 5a–5g juxtapose a series of timing diagrams to illustrate timing relationships for various voltages.
Figures 5C, 5D, 5E, 5F:
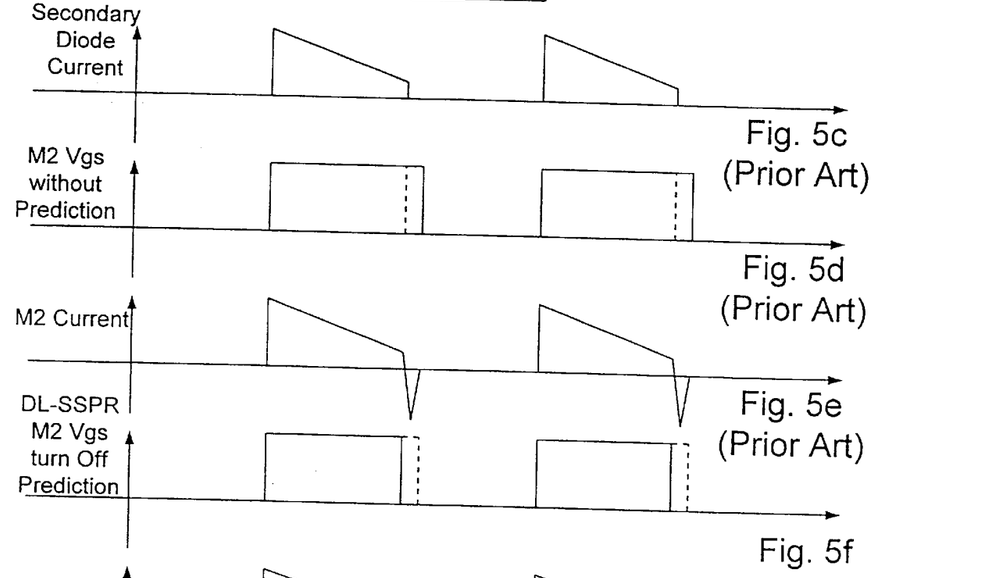

Referring to FIGS. 5a–5g, the timing diagrams of the relevant voltage levels and current levels are illustrated to provide a better understanding of the methods of the preferred embodiment of the present invention. FIG. 5a illustrates the ideal voltage wave form, Vgs, for the primary switch, which is a square wave form generated by the primary PWM control circuit on the primary side. FIG. 5b illustrates one ideal logical synchronization voltage wave form. In this case, it is a square wave that is complementary to the square wave generated by the primary switch. In the secondary subcircuit of the prior art where a diode is used, the timing diagram of the current going through the diode is illustrated by FIG. 5c. In order to replace the diode of the prior art secondary subcircuit by a transistor, transistor M2 is placed at the location as is illustrated in FIG. 4 and must be turned off before the primary switch is turned on. Otherwise, reverse conduction would result. FIG. 5d illustrates the voltage wave form using conventional control methods, where the M2 transistor is turned off only after detecting that there that is not a forward current (or positive voltage) and that the current has reversed in direction (or negative voltage). Correspondingly, the delay in turning off the M2 transistor in time would result in the discharge of current from the capacitor where the discharge is shown by the downward current spike illustrated in FIG. 5e.

Figure 5G:
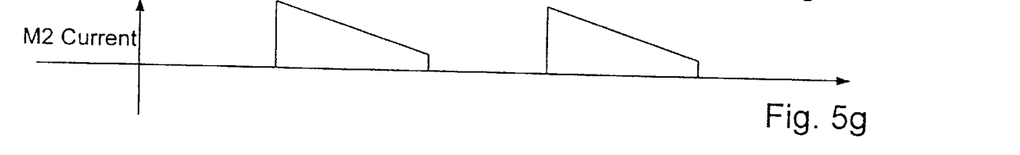

Since the secondary subcircuit has no direct link to the primary regulation circuit, in order to avoid the generation of reverse conduction current (the downward current spike), transistor M2 must be turned off in time or slightly earlier in time. FIG. 5f illustrates the desired Vgs timing diagram for transistor M2 (which is also the Vgs timing generated by the presently preferred embodiment). In order to generate such timing diagram, the circuit of the preferred embodiment must be able to predict primary switch timing and turn transistor M2 off before the primary switch turns on. When transistor M2 is turned off at the proper time, referring to FIG. 5g, the current going through transistor M2 remains positive for all time periods and reverse conduction is avoided.

Figure 6:
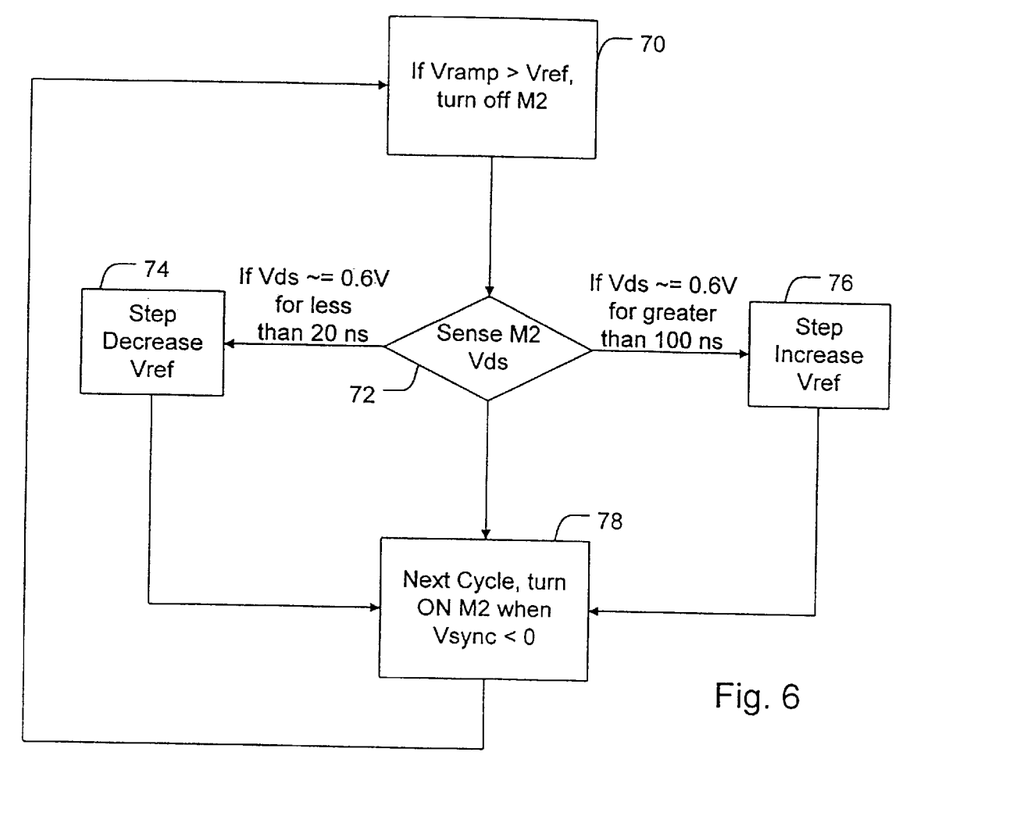
FIG. 6 is a flow chart illustrating the logic for predicting and controlling the turning on and off of the transistor to prevent reverse conduction.

In order to predict primary switch timing, primary switch timing for the last time period is used in conjunction with the body diode of (or an external diode for) transistor M2. A ramp voltage, Vramp, having an upward slope corresponding to the situation when coil energy is being discharged to the load, is generated, and Vramp is also produced as a function of Vsyn where Vsyn is complementary to Vgs for the primary switch. The generating of the ramp voltage is in relation with the on and off timing of the primary switch and is not limited to a particular shape or form. FIG. 6 illustrates the flow chart for determining the timing control for transistor M2. Transistor M2 is turned off when Vramp is greater than a reference voltage (Vref) 70. The reference voltage is initially set to zero volt and is used as a reference voltage point. For the first few cycles, transistor M2 can be programmed to be turned off immediately after it was turned on or can simply remain off for the first few cycles. In the next step, the voltage across the body diode of transistor M2 is detected. When transistor M2 is off, transistor M2 body diode conducts and Vds is at a forward body diode voltage that may be −0.6 volt or otherwise, depending on the device. This body diode voltage is detected and Vref is upwardly adjusted accordingly. If Vds equals the forward body diode voltage for a time period greater than a first predefined time period, Vref is step increased a first predetermined amount 76. In the presently preferred embodiment, the predefined time period is set at 100 ns. If Vds equals the forward body diode voltage for a time period less than a second predefined time period, Vref is step decreased a second predetermined amount 74. In the next cycle, transistor M2 is turned on when Vsync is less than 0 volt. This detection and adjustment process repeat in a continuous loop.

Figure 7A:
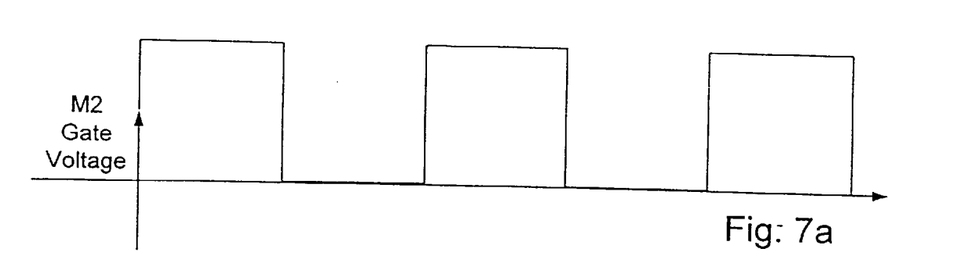
FIGS. 7a–7c illustrate timing diagrams for the diode-less prediction circuit.
Figure 7B:
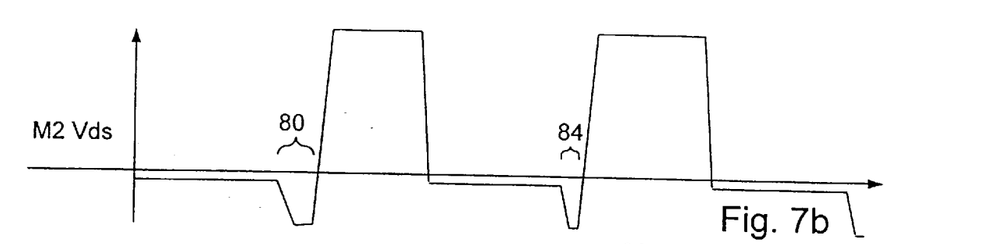
Figure 7C:
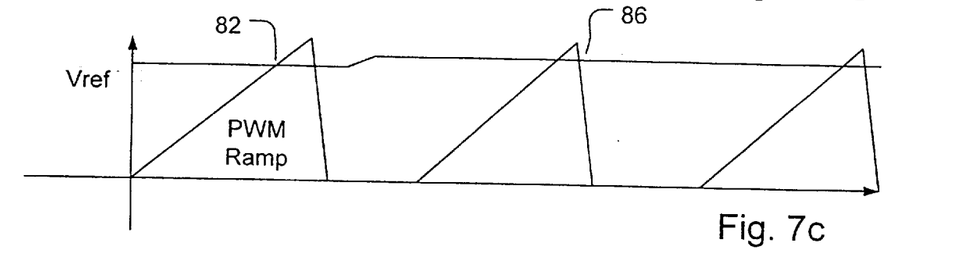

FIGS. 7a–7c illustrate Vref and Vramp in accordance with the detected voltage level of the body diode of transistor M2 and the duration of such voltage level. More specifically, FIG. 7a illustrates Vgs for transistor M2, FIG. 7b illustrates Vds for transistor M2, and FIG. 7c illustrates the ramp voltage, Vramp, and the reference voltage, Vref. As is illustrated by FIG. 7c, when Vref intersects Vramp at the intersection indicated at 82, Vgs is turned off to prevent reverse conduction. When body diode conduction caused by transistor M2 being turned off at a time that is greater than a predefined period of time (100 ns), Vref would be upwardly adjusted such that Vref would intersect Vramp at a later point in time and transistor M2 would be turned off at a later point in time to minimize or prevent body diode conduction. On the other hand, if the time period is less than the predefined period of time, e.g. the time period less than 20 ns, Vref would be downwardly adjusted so that transistor M2 is turned off earlier in time to prevent reverse conduction. Transistor M2 is turned on when Vsync is less than zero.

Figure 8:
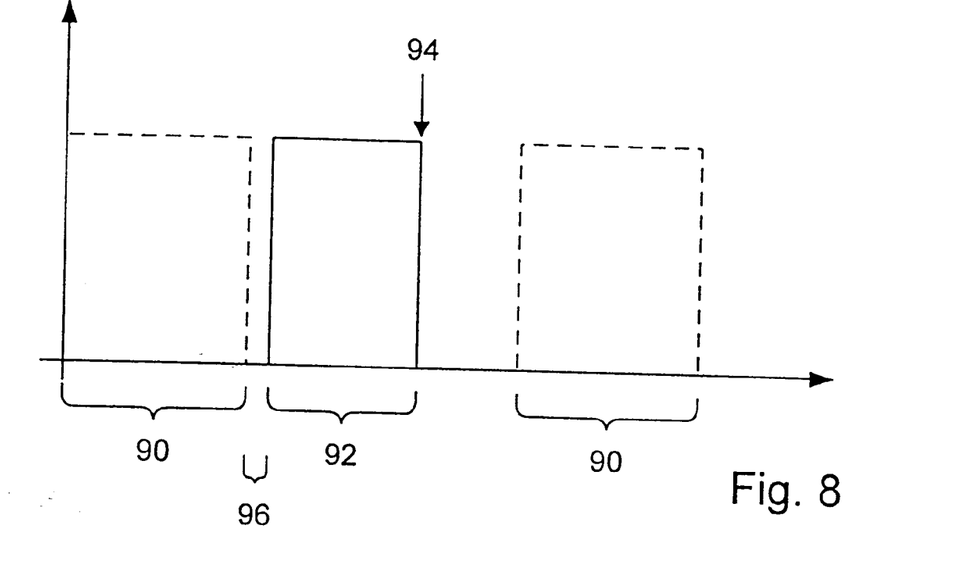
FIG. 8 shows an aspect in the regulation of the output voltage.

With respect to the operation of transistor M1, referring to FIG. 8, transistor M1 operates as the PWM switch for the secondary subcircuit and is controlled by the DL-SSPR control circuit (FIG. 4, 64) to regulate the converter output voltage. After the primary switch is turned off, the mutual inductance discharges its energy to the converter output (load). The DL-SSPR uses transistor M1's on-time/off-time ratio to regulate the output voltage. The primary switch on-time is indicated at 90, and transistor M1 on-time is indicated at 92. By adjusting the trailing edge of transistor M1 (94) to the left thereby reducing transistor M1 on-time, the output voltage is reduced as well. By adjusting the trailing edge to the right thereby increasing transistor M1 on-time, the output voltage is increased as well.

Figure 9:
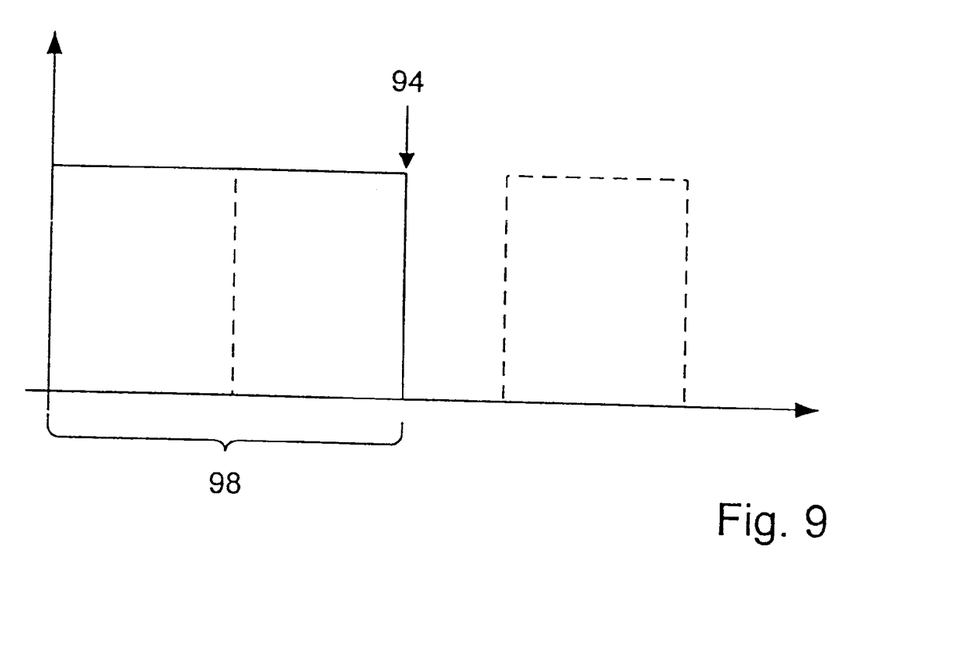
FIG. 9 shows the voltage timing relationship between the primary switch and Vgs for transistor M1.

However, while this is a common technique, during the time period as indicated at 96 which is the time period after the primary switch is on (90) and before transistor M1 is turned on (92), the voltage at the sync node is floating with respect to the converter's common node. Since the voltage at the sync node is used to synchronize the DL-SSPR timing with respect to the primary switch, a floating sync voltage makes it difficult to accomplish synchronization. In the preferred embodiment of the present invention, referring to FIG. 9, transistor M1 is turned on (as indicated at 98) by the DL-SSPR control circuit when the primary switch is on.

Figure 10A:
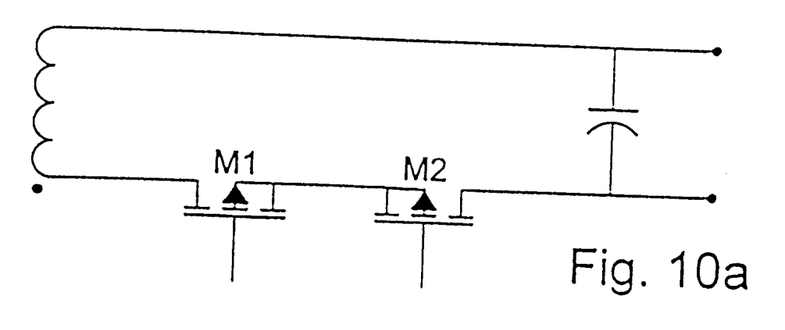
FIGS. 10a–10c illustrate alternative converter circuits.
Figure 10B:
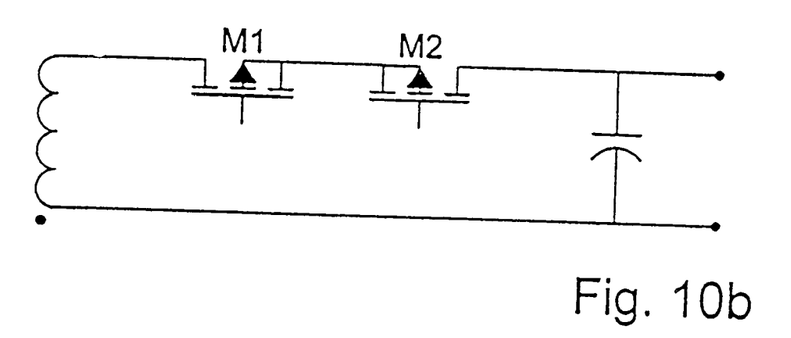
Figure 10C:
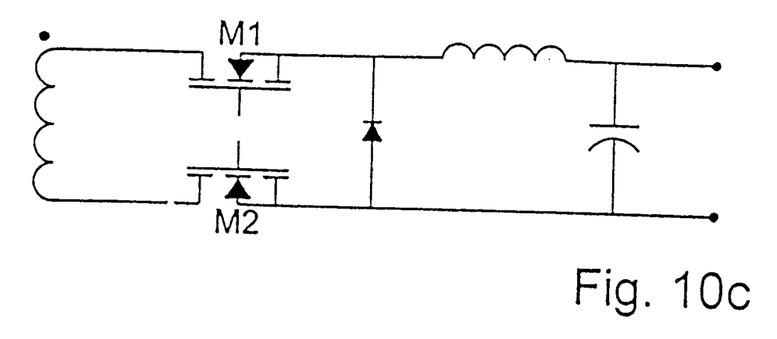

The present invention is not limited to a particular type of transistor or converter circuit. NMOS, PMOS, or other types of transistors can be used to achieve the methods described herein. Other converter circuit arrangements can be adapted to take advantage of the present invention. FIGS. 10*a*, 10*b*, and 10*c* illustrates certain ones of the alternative secondary subcircuit variations in the arrangement of the circuit components. More specifically, FIG. 10*a* illustrates a coil for generating a voltage potential and a corresponding current to pass through a capacitor, transistors M1 and M2, and back to the coil. FIG. 10*b* illustrates a coil for generating a voltage potential and a corresponding current to pass through transistors M1 and M2, a capacitor, and back to the coil. FIG. 10*c* shows a coil for generating a voltage potential and corresponding current that passes through transistor M1, an inductor, a capacitor, transistor M2, and back to the coil; a diode is disposed at one terminal between transistor M1 and the inductor and at another terminal between transistor M2 and the capacitor.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

What we claim are:

1. A method for generating a voltage potential from a provided energy source, comprising the steps of:
   generating a first voltage potential from a provided energy source;
   regulating said first voltage potential to generate a second voltage potential by
     turning on said first transistor at a point in time before the primary switch for generating said magnetic field turns off,
     turning off said first transistor at a point in time corresponding to the generation of said second voltage potential; and
   rectifying said second voltage potential through the use of a second transistor and operating said second transistor as a function of the Vds voltage of said second transistor.

2. A method as recited in claim 1 wherein said provided energy source is a magnetic field.

3. A method for generating a voltage potential from a provided energy source, comprising the steps of:
   generating a first voltage potential from a provided energy source;
   regulating said first voltage potential to generate a second voltage potential; and
   rectifying said second voltage potential through the use of a second transistor and operating said second transistor as a function of the Vds voltage of said second transistor, said rectifying step including
     generating a periodic ramp voltage as a function of the voltage for generating said magnetic field and said magnetic field;
     generating a bias voltage having a voltage potential in the same range as the voltage potential of said ramp voltage; and
     turning off said second transistor when the voltage potential of said bias voltage is at the same level as the voltage potential of said ramp voltage.

4. A method as recited in claim 3 further including the step of sensing the Vds voltage across said second transistor.

5. A method as recited in claim 4 further including the step of determining the time for turning off said second transistor as a function of the sensed Vds voltage across said second transistor.

6. A method as recited in claim 5 further including the step of upwardly adjusting said bias voltage to turn off said second transistor at a later point in time when the Vds voltage of said second transistor is at a particular diode voltage potential for a duration greater than a first predefined duration.

7. A method as recited in claim 6 wherein said particular diode voltage is the forward diode voltage of an external diode connected across the drain and source terminal of said second transistor.

8. A method as recited in claim 6 wherein said particular diode voltage is the forward body diode voltage of said second transistor.

9. A method as recited in claim 5 further including the step of downwardly adjusting said bias voltage to turn off said second transistor at an earlier point in time when the Vds voltage of said second transistor is at a particular diode voltage potential for a duration less than a second predefined duration.

10. A method as recited in claim 9 wherein said particular diode voltage is the forward diode voltage of an external diode connected across the drain and source terminal of said second transistor.

11. A method as recited in claim 9 wherein said particular diode voltage is the forward body diode voltage of said second transistor.

12. A converter circuit for generating a secondary voltage potential from a provided energy source, comprising:
   generating means for generating a first voltage potential from said provided energy source;
   regulating means including a first transistor for regulating said first voltage potential to generate a second voltage potential;
   rectifying means including a second transistor for preventing reverse conduction of the current of said second voltage potential, said second transistor being operative to prevent reverse conduction and being operated as a function of the Vds voltage of said second transistor; and
   control means for operating said regulating means and said rectifying means.

13. A converter circuit as recited in claim 12 wherein said generating means is a coil.

14. A converter circuit as recited in claim 12 wherein a ramp voltage potential and a bias voltage potential are provided where said second transistor is turned off when said bias voltage potential is at the same level as the ramp voltage potential.

15. A converter circuit as recited in claim 14 wherein said second transistor is turned off at an earlier point in time when the Vds voltage of said second transistor equals to a particular diode voltage for a duration that is less than a second predefined duration.

16. A converter circuit as recited in claim 15 wherein said particular diode voltage is the forward body diode voltage of said second transistor.

17. A converter circuit as recited in claim 15 wherein said particular diode voltage is the forward diode voltage across the drain and source terminals of said second transistor.

18. A converter circuit as recited in claim 14 wherein said second transistor is turned off at a later point in time when the Vds voltage of said second transistor equals to a particular diode voltage for a duration that is greater than a first predefined duration.

19. A converter circuit as recited in claim 18 wherein said particular diode voltage is the forward diode voltage across the drain and source terminals of said second transistor.

20. A converter circuit as recited in claim 18 wherein said particular diode voltage is the forward body diode voltage of said second transistor.

21. A converter circuit for generating a secondary voltage potential, comprising:
   a coil responsive to an energy source to generate a first voltage potential, said energy source including a magnetic field;
   a first transistor connected in series with said coil for regulating said first voltage potential to generate a second voltage potential;
   a capacitor connected in series with said first transistor;
   a second transistor connected in series with said capacitor at one terminal and said coil at another terminal;
   an output terminal across said capacitor for outputting said generated second voltage potential; and
   a control circuit for operating said first transistor and said second transistor in response to said generated second voltage potential, said control circuit being operative to generate an adjustable bias voltage having a voltage potential in the same range as the voltage potential of said ramp voltage.

22. A converter circuit as recited in claim 21 wherein said control circuit generates a ramp voltage as a function of the voltage for generating the magnetic field.

23. A converter circuit as recited in claim 21 wherein a primary switch operates a primary coil to generate said magnetic field and said control circuit operates said first transistor in generating said second voltage potential and turns on said first transistor at a point in time before said primary switch is turned off.

24. A converter circuit as recited in claim 21 wherein said control circuit operates said first transistor in generating said second voltage potential and turns off said first transistor at a point in time before said primary switch is turned on.

25. A converter circuit as recited in claim 21 wherein said second transistor is turned off when the voltage potential of said bias voltage is at the same level as the voltage potential of said ramp voltage.

26. A converter circuit as recited in claim 25 wherein said control circuit downwardly adjusts said bias voltage to a lower potential to turn off said second transistor at an earlier point in time when the Vds voltage of said second transistor is at a particular diode voltage potential for a duration less than a second predefined duration.

27. A converter circuit as recited in claim 26 wherein said particular diode voltage is the forward body diode voltage of said second transistor.

28. A converter circuit as recited in claim 26 wherein said particular diode voltage is the forward diode voltage across the drain and source terminals of said second transistor.

29. A converter circuit as recited in claim 26 where said second predefined duration is 20 ns.

30. A converter circuit as recited in claim 15 wherein said control circuit upwardly adjusts said bias voltage to a higher voltage potential to turn off said second transistor at a later point in time when the Vds voltage of said second transistor is at a particular diode voltage potential for a duration greater than a first predefined duration.

31. A converter circuit as recited in claim 30 wherein said particular diode voltage is the forward body diode voltage of said second transistor.

32. A converter circuit as recited in claim 30 wherein said particular diode voltage is the forward diode voltage across the drain and source terminals of said second transistor.

33. A converter circuit as recited in claim 30 where said first predefined duration is 100 ns.

34. A converter circuit as recited in claim 21 wherein said control circuit operates said second transistor as a function of the Vds of said second transistor.

* * * * *